US012338963B2

(12) United States Patent
Dirr et al.

(10) Patent No.: US 12,338,963 B2
(45) Date of Patent: Jun. 24, 2025

(54) LIGHT MODULE AND VEHICLE LIGHT

(71) Applicant: PLASTIC OMNIUM LIGHTING SYSTEMS GmbH, Munich (DE)

(72) Inventors: Christoph Dirr, Munich (DE); Huayun Feng, Munich (DE)

(73) Assignee: PLASTIC OMNIUM LIGHTING SYSTEMS GMBH, Munich (DE)

( * ) Notice: Subject to any disclaimer, the term of this patent is extended or adjusted under 35 U.S.C. 154(b) by 0 days.

(21) Appl. No.: 18/615,772

(22) Filed: Mar. 25, 2024

(65) Prior Publication Data

US 2024/0426444 A1 Dec. 26, 2024

(51) Int. Cl.

| | |
|---|---|
| ***F21S 41/19*** | (2018.01) |
| ***F21S 41/141*** | (2018.01) |
| ***F21S 41/151*** | (2018.01) |
| ***F21S 43/14*** | (2018.01) |
| ***F21S 43/19*** | (2018.01) |
| ***F21S 45/47*** | (2018.01) |

(52) U.S. Cl.

CPC ........... *F21S 41/192* (2018.01); *F21S 41/141* (2018.01); *F21S 41/151* (2018.01); *F21S 43/14* (2018.01); *F21S 43/195* (2018.01); *F21S 45/47* (2018.01)

(58) Field of Classification Search

CPC ...... F21S 41/192; F21S 43/195; F21S 41/141; F21S 41/151; F21S 43/14; F21S 45/47

See application file for complete search history.

(56) References Cited

U.S. PATENT DOCUMENTS

2011/0019398 A1* 1/2011 Bishop .................. H05K 1/142 362/225

FOREIGN PATENT DOCUMENTS

EP 3805637 A1 * 4/2021 .............. F16B 5/045
WO WO-2021002336 A1 * 1/2021 ............ F21S 41/141

OTHER PUBLICATIONS

Search English translation of EP-3805637-A1 (Year: 2021).*
Search English translation of WO-2021002336-A1 (Year: 2021).*

* cited by examiner

*Primary Examiner* — Omar Rojas Cadima
(74) *Attorney, Agent, or Firm* — Organization

(57) ABSTRACT

The invention relates to a lighting module (10), in particular for a vehicle, comprising a lighting means (12), a supply circuit board (14), and a heat sink (16). The supply circuit board (14) comprises a plug connection region (18) for an external current signal supply and a lighting means connection region (20) for an electrical connection of the lighting means (12). It is proposed that the plug connection region (18) comprises tongue terminals (24) affixed to the supply circuit board (14) for electrically connecting a circuit board plug coupling (22) of the external current signal supply, and the lighting means connection region (20) comprises connection pads (26) for an electrically conductive bonded connection of the lighting means (12) to the supply circuit board (14). In an independent aspect, the invention relates to a vehicle light having an aforementioned lighting module (10).

20 Claims, 4 Drawing Sheets

LIGHT MODULE AND VEHICLE LIGHT

The invention relates to a lighting module, in particular for a vehicle, comprising a lighting means, a supply circuit board, and a heat sink, wherein the supply circuit board comprises a plug connection region for an external current signal supply and a lighting means connection region for an electrical connection of the lighting means.

In addition, the invention relates to a vehicle light having this type of lighting module.

PRIOR ART

In the field of vehicle lighting technology, high value is placed on standardization and simple exchangeability. Recently, the development of interchangeable lighting modules (exchangeable light engine—XLE) is favored. This can be used in particular in the field of headlights for low beam, high beam or daytime running lights, and as fog headlights, or for other lighting tasks in the vehicle. The development of a cost-optimized and qualitatively durable, exchangeable lighting module is the emphasis.

LED lighting means (light emitting diodes) are preferably used for interchangeable lighting modules. As a rule, they are connected to the onboard electronics and the power supply via a supply circuit board and a plug coupling terminal, and have a heat sink in order to prevent overheating of the lighting means.

To date, a plug coupling terminal was designed as a so-called SMD connection socket (surface mounted device) on the supply circuit board, which serves as an interface between the lighting means and the power supply. The SMD connection socket is soldered onto or into the supply circuit board and serves for connection to the on-board electronics; and furthermore the lighting means is generally connected to the supply circuit board via bonding wires. A bonded connection is thermally stable and can ensure a safe electrical connection even with high heat losses of the lighting means.

Light emitting diodes (LEDs) emit high thermal energy during operation due to their high power in a compact installation space. In order to protect LEDs from overheating and thus not destroy them during operation, heat that is generated must be effectively dissipated. For this purpose, the thermal energy is emitted to a heat sink, which can be a cooling device, usually made of aluminum or copper, or the surrounding environment, for example air.

The disadvantage of the previously known, exchangeable lighting modules is the use of the relatively costly SMD connection base and the complex production of the lighting module, which must be produced in large quantities, and is intended to be designed to be simple and trouble-free to replace—in particular, without tools.

The object of the present invention is to provide a lighting module which is cost-effective and simple to produce, and is preferably replaceable, with optimized heat dissipation, and a cost-effective and simple vehicle light with optimized heat dissipation, at low production costs.

This object is achieved by a lighting module and by a vehicle light according to the features of the independent claims.

Particularly advantageous embodiments are found in the dependent claims.

DISCLOSURE OF INVENTION

A lighting module, in particular for a vehicle, is proposed, comprising a lighting means, a supply circuit board, and a heat sink, wherein the supply circuit board comprises a plug connection region for an external current signal supply and a lighting means connection region for an electrical connection of the lighting means.

According to the invention, the plug connection region comprises tongue terminals applied to the supply circuit board for electrically connecting a circuit board plug coupling of the external current signal supply, and the lighting means connection region comprises connection pads for an electrically conductive bonded connection of the lighting means to the supply circuit board.

In other words, a lighting module is proposed which can dissipate the waste heat of a lighting means via a heat sink to the surroundings. A supply circuit board implements an electrical connection between the lighting means and an external current signal supply, wherein the supply circuit board has both a plug connection region for a circuit board plug coupling and a lighting means connection region which is provided for an electrically conductive bonded connection to the lighting means. In this respect, a circuit board plug coupling (PCB connector) can be used which is generally designed as a plastic contact plug element for current signals, and which can be plugged onto an edge region of the supply circuit board (supply PCB/printed circuit board), which edge region is provided with the electrical tongue terminals. In particular, for space saving reasons, the circuit board plug coupling can be designed as a so-called PCB-board edge connector, i.e., as an angled circuit board plug coupling. A relatively costly SMD connection socket and a soldering attachment on the supply circuit board can thereby be spared.

According to the invention, tongue terminals are provided on the plug connection region of the supply circuit board. In order to minimize transition resistances, a gold coating of the tongue terminals can preferably be realized, for example, by chemical gold (ENIG: electroless nickel immersion gold or the like) or by means of selective gold deposition on the tongue terminals. Alternatively and preferably, because it is more cost-effective, a tin plating can be applied to the tongue terminals via a hot welding application—which is substantially easy to produce and economically attractive. Due to the tin plating, the contact springs of the circuit board plug coupling can also be designed to be significantly more favorable, since their surface design should preferably correspond to the material property of the tongue terminals. In contrast to an advantageous tin plating, a combination of electrical voltage and moisture can promote electrolysis in the contact region of gold on nickel, and of the tin-plated copper. This can lead to the fact that, if the gold layer is too thin, a very thin gold layer is volatilized, and ultimately the nickel is all that remains, wherein the arising neodymium/nickel oxide layer is disadvantageously insulating, and does not have an electrically conductive effect.

On the other hand, the lighting means is generally connected by bonding wires to the lighting means connection region of the supply circuit board. To create a bonded connection, preferably made of aluminum or as a gold bonded wire connection, the connection pads of the lighting means connection region of the supply circuit board provided for this purpose are furnished from the same material.

In an advantageous development, the lighting means can be an LED lighting means. Due to their high efficiency, low waste heat, high power density, and high service life in the field of vehicle lighting, LED lighting means also have proven to be useful headlights and high beams.

In an advantageous development, the lighting means can be electrically conductively connected to the lighting means connection region of the supply circuit board with a ribbon bonded connection, preferably an aluminum ribbon bonded connection, and in particular produced by an ultrasonic welding method. Such a bonded wire connection is thermally stable and, along with the lowest conductor resistances, enables a high current load capacity, so that it ensures a high longevity of the power supply of the lighting means.

In an advantageous development, the supply circuit board can be tin-plated at least in a surface region of the plug connection region and in a surface region of the lighting means connection region. In particular, the connection pads can be tin-plated. The tin plating of a circuit board, in particular a single-sided or two-sided tin plating of a PCB surface, or parts thereof, is a conventional processing step in PCB production, which can be carried out cost-effectively, stably, and easily with predefined material thicknesses.

The production of a supply circuit board which has connection pads in a lighting means connection region which can be directly bonded, and which on the other side has tongue terminals in a plug connection region which can be connected directly to a circuit board plug coupling, and are preferably tin-plated, is relatively costly. This is because the tongue terminals surface regions of the plug connection region provided with a solder coating are not compatible with the connection pads of the lighting means connection region provided for a bonding process. This can be remedied by an additional selective gold coating of the plug contacts on the circuit board plug coupling, but would lead to significantly higher production costs. In this respect, subregions of the supply circuit board, in particular the tongue terminals for the circuit board plug coupling, can be provided with a solder layer; other subregions, in particular the connection pads for the lighting means, can be provided with an aluminum or gold layer, which makes the production of the supply circuit board complex. In an advantageous development, separate ribbon bonding contact elements can therefore be electrically contacted, in particular soldered, on the supply circuit board, in particular soldered, on the connection pads in the lighting means connection region, which can provide a bond base for a ribbon bonded connection, in particular an aluminum ribbon bonded connection. The ribbon bonding contact elements serve as a technological connection interface between the bonded wire connection to the lighting means and the solder connection pads of the supply circuit board, which can preferably be tin-plated, so that the entire supply circuit board or at least parts thereof, in particular the plug connection region and the lighting means connection region, can be coated with a solder coating along the current paths. This makes the production process of the supply circuit board extremely simple and cost-effective. The use of the separate ribbon bonding contact elements makes it possible to provide an aluminum wire bonded connection on an upper side of the supply circuit board in combination with a tin-plated surface and a circuit board plug coupling with tin-plated tongue terminals. This considerably reduces the costs of the XLE lighting module.

In an advantageous development of the aforementioned embodiment, the ribbon bonding contact elements can have a multilayer design, and a bonding material-coated upper side, in particular an aluminum-coated or aluminum alloy-coated upper side and a tin-coated underside—and in particular, a copper core or alloys such as bronze or the like. In this respect, the ribbon bonding contact elements on the upper side are formed for a ribbon bonded connection, in particular of aluminum or of gold, and are tin-plated or likewise gold-plated on an underside for a soldered connection to the connection pads. In order to provide high electrical conductivity of the ribbon bonding contact elements, a middle layer can consist of electrically highly conductive copper, aluminum, or a copper alloy, in order to minimize transition resistances. The ribbon bonding contact elements can be produced separately, and stored, for example, on a magazine strip for an equipping machine which uses soldering or an electrically conductive adhesive connection to the connection pads of the lighting means connection region of the supply circuit board.

In a further advantageous embodiment of the ribbon bonding contact element, the upper side can have an AlSi alloy coating with a thickness of 10 μm to 30 μm. The middle layer can preferably be a CuSn6 copper alloy with a thickness of 0.2-0.8 mm. The underside can preferably be a tin layer having a thickness of 5 to 20 μm.

In an advantageous development, the heat sink can have a circuit board receiving region for the supply circuit board and can elevate, at least by the thickness of the supply circuit board, a lighting means receiving region for the lighting means. Due to the recessed arrangement of the supply circuit board in the heat sink, the bonding wires can be guided horizontally to the elevated position of the lighting means, so that a design of the lighting module that is as compact and space-saving as possible results. The height of the connection pads of the supply circuit boards accordingly corresponds approximately to the height of the connection pads of the bonding wires of the lighting means.

In an advantageous development, the heat sink can consist of a thermally conductive material, in particular copper, a copper alloy or aluminum, and the supply circuit board can preferably be fastened in the circuit board receiving region of the heat sink by means of mechanical latching or rivet elements, and furthermore preferably the circuit board receiving region has a cut-out or recess portion around the plug connection region of the supply circuit board. The supply circuit board can be connected to the heat sink in a secure manner without tools by the latching or rivet elements, so that, for example in the event of failure of the lighting means, the heat sink can be reused.

In an advantageous development, the lighting means can be fastened in a heat-conducting manner on a lighting means receiving region of the heat sink, in particular on an elevated lighting means receiving region with respect to a circuit board receiving region of the supply circuit board of the heat sink—in particular, glued with a heat conducting adhesive. By using a heat-conducting adhesive, the waste heat of the lighting means can be diverted directly to the heat sink with low thermal resistance, wherein the adhesive serves both for mechanical fixing and for thermal coupling of the heat sink.

In an advantageous development, the heat sink can carry, at least in regions, preferably over the entire surface, a surface anodization layer, and have a lighting means receiving region which has an exposed surface region without an anodization layer, at least in regions in particular, where the anodization layer is removed by means of laser ablation. The anodization of the heat sink, which preferably consists of aluminum, and is referred to as an eloxal method, prevents oxidation and insulates the heat sink in order to prevent undesired short-circuit current paths. Furthermore, a black eloxal layer that can be produced cost-effectively increases the heat emitting properties, and improves the convection properties of the heat sink. A heat path runs from the lighting means as a heat source, for example the LED, to the heat sink. Components or layers located therebetween, for example paints or an anodization, constitute thermal resistances, for example due to their shape and/or their material. By a subsequent selective removal of the anodization layer in the lighting means receiving region, the thermal coupling of the lighting means to the heat sink can be improved; and this can be done automatically and cost-effectively by means of laser ablation.

In an independent aspect, a vehicle light having a lighting module described above is proposed which can be used in particular as a headlight or taillight, or as a fog light, rear fog light, or for the interior cabin lighting in a vehicle. A headlight equipped with an aforementioned lighting module can be equipped cost-effectively with a lighting module of high luminosity and long service life, wherein a simple and tool-free replaceability is ensured in the event of a defect in the lighting module. This optimizes the overall costs of the production, and also the technical functionality of the headlight or the taillight.

DRAWINGS

Further advantages are found in the following description of the drawings. Embodiments of the invention are shown in the drawings. The drawings, the description and the claims contain numerous features in combination. A person skilled in the art will expediently also consider the features individually and combine them into expedient further combinations.

In the drawings.

In the figures, like elements are denoted by the same reference signs. The figures only show examples and are not to be understood as limiting.

Figure 1:
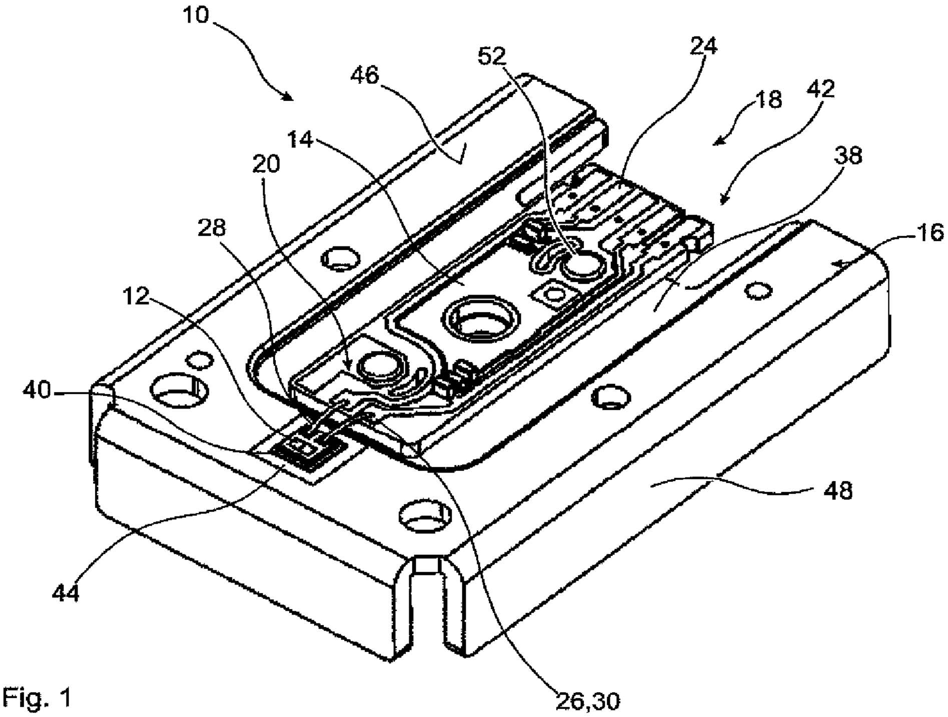
FIG. 1 shows a perspective view of an embodiment of a lighting module according to the invention.

FIG. 1 shows a perspective view of an embodiment 10 of a lighting module according to the invention. The lighting module 10 comprises a lighting means 12 which is connected to a supply circuit board 14 via a ribbon bonded connection 28. In a lighting means connection region 20, the supply circuit board 14 has two connection pads 26. The supply circuit board 14 is designed as a substantially rectangular, elongated PCB, and has two recesses through which the latching or rivet elements 52 pass in order to connect the supply circuit board 14 to a heat sink 16. A plug connection region 18 is located at the end of the supply circuit board 14 opposite the lighting means connection region 20. The plug connection region 18 has multiple tongue terminals 24, the surface of which is tin-plated. A circuit board plug coupling 22 (not shown) can be pushed onto the edge of the plug connection region 18 in order to provide a current signal connection of the lighting module 10 to the on-board electronics.

The heat sink 16 has a rectangular surface region, and flank regions 48 angled off on three sides, which are used, inter alia, for fastening in a vehicle headlight (not shown) and for increasing the mechanical strength. The heat sink consists of aluminum anodized on the surface, which can be produced by an anodization process (eloxal method) in order to passivate the surface and electrically insulate it.

The supply circuit board 14 is fastened in a recessed circuit board receiving region 38 of the heat sink 16 by means of latching rivet elements 52. In the plug connection region 18, the heat sink 16 has a recess portion 42 of the circuit board receiving region 38, so that a circuit board plug coupling 22 can be pushed onto the plug connection region 18 and can be partially surrounded by the heat sink 16. This serves for installed space optimization.

The heat sink 16 has a lighting means receiving region 40 which is elevated relative to the circuit board receiving region 38 and on which the lighting means 12 in the form of an LED component is glued. The lighting means 12 is fastened by means of a thermally conductive adhesive 44 to a surface region 50 of the heat sink 16, shown in enlargement in FIG. 2, and freed of its anodization layer. Good thermal coupling between lighting means 12 and heat sink 16 is provided by the thermally conductive adhesive 44 and the exposed surface region 50, so that waste heat of the lighting means 12 can be effectively dissipated to prevent thermal overloading and to extend the service life. Due to the elevated attachment of the lighting means 12 to the supply circuit board 14, the bond wires of the bonded connection 28 can be guided substantially parallel to the surface of the heat sink 16 and can thus be mechanically protected from damage.

Figure 5:
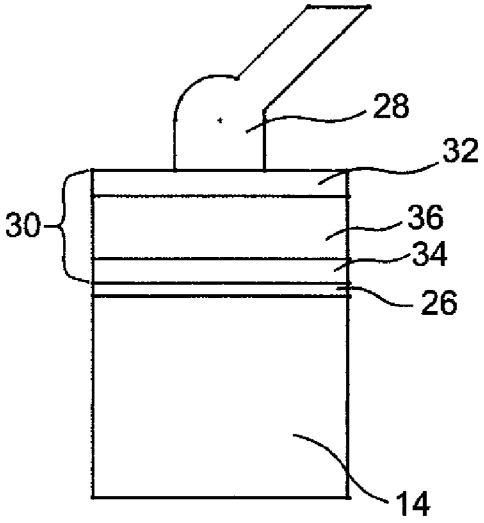
FIG. 5 shows an embodiment of a ribbon bonding contact element for use in an embodiment of a lighting module according to the invention.

In the lighting means connection region 20 of the supply circuit board 14, a ribbon bonding contact element 30 is soldered on each connection pad 26, the underside 34 of which, as shown in FIG. 5, has a solder layer or tin layer, and the upper side 32 of which has an aluminum layer which can be used for an aluminum ribbon bonding. The ribbon bonded connections 28 for electrically connecting the supply circuit board 14 to the lighting means 12 are provided on the upper side 32 of the ribbon bonding contact elements 30. By means of the ribbon bonding contact elements 30, it is possible to tin-plate the surface of the supply circuit board 14 at least in regions, and thus to enable an electrical connection with a cost-effective circuit board plug coupling 22, and furthermore to provide a bonded connection 28 with high thermal load to the lighting means 12. The overall costs for the production of the lighting module 10 are thereby drastically reduced.

Figure 2:
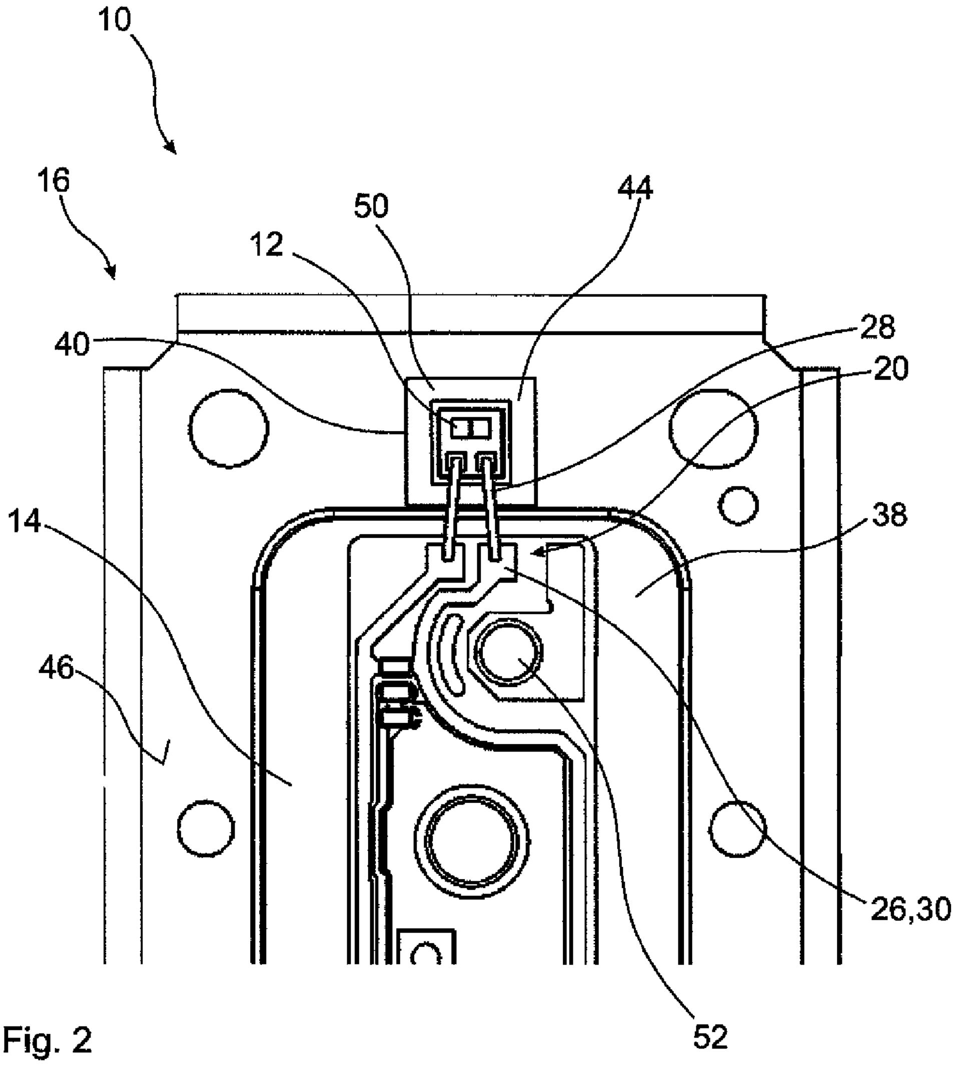
FIG. 2 shows an enlarged plan view of a lighting means connection region of the embodiment according to FIG. 1.

FIG. 2 shows the enlarged detail of the lighting means connection region 20 of the supply circuit board 14 and of the lighting means receiving region 40 of the heat sink 16. Ribbon bonding contact elements 30 are attached to the connection pad 26 of the lighting means connection region 20 as an interface between the two connection techniques of soldering and bonding. By means of such interface contact elements 30, the supply circuit board 14 can be produced comparatively cheaply in series production, and the bonded connection 28, which represents a technologically demanding and high-quality connection technique, can furthermore be used without increasing costs and effort for producing the connection board 14.

Figure 3:
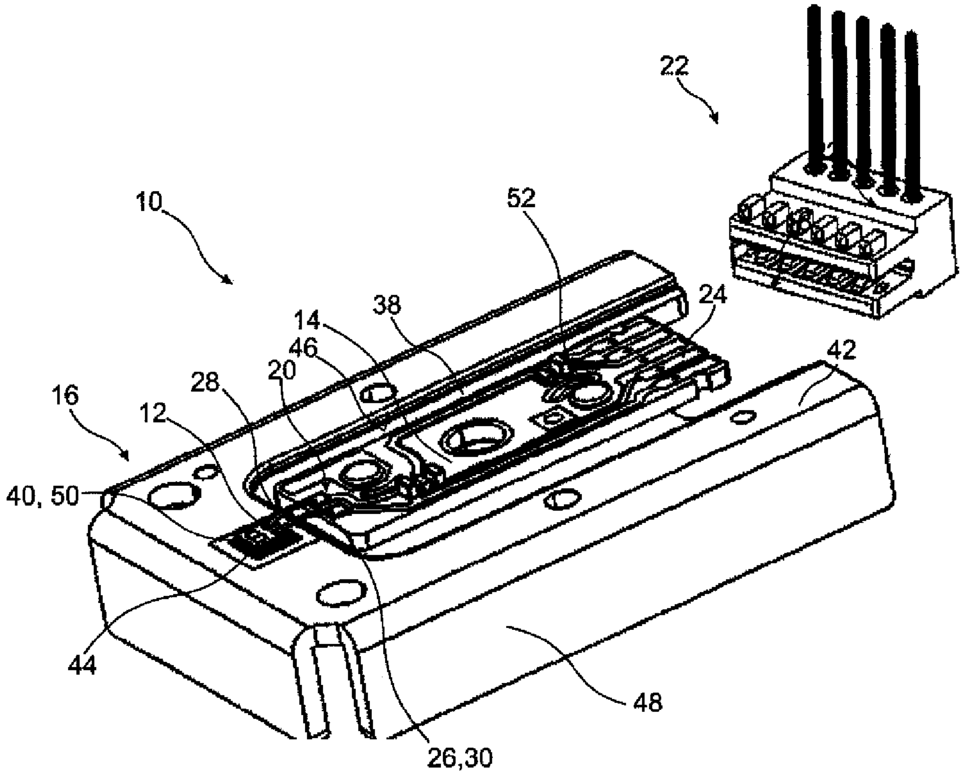
FIG. 3 shows a further perspective illustration of the embodiment of a lighting module according to the invention according to FIG. 1.

FIG. 3 shows a further perspective view of the lighting module 10 of FIG. 1. In addition, an embodiment of a circuit board plug coupling 22 is shown, which can be pushed onto the tongue terminals 24 of the plug connection region 18 of the supply circuit board 14 in a shape complementary thereto. By means of the recess portion 42 of the circuit board receiving region 38, the circuit board plug coupling 22 can be electrically connected to the lighting module 10 in a space-saving and mechanically protected manner by the heat sink 16. By means of the plurality of tongue terminals 24, it is possible to allowing setting or relaying various operating modes of the lighting module 10—for example, high intensity, low intensity, status message, or a further function provided by the supply circuit board 14 or the lighting means 12 to the onboard electronics, in addition to the voltage supply.

Figure 4:
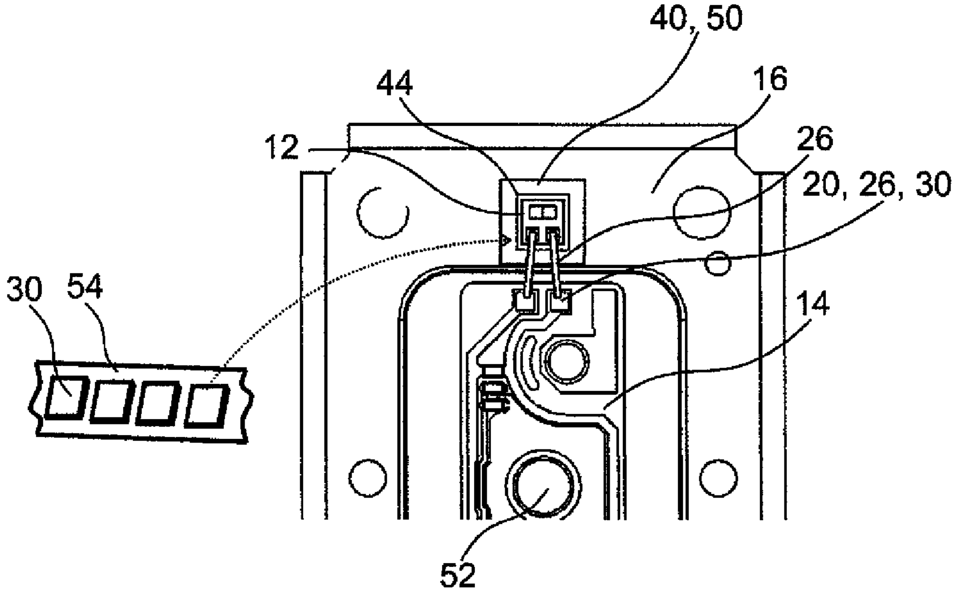
FIG. 4 shows an illustration of the equipping of a lighting means connection region of the supply circuit board with ribbon bonding contact elements according to one embodiment of the invention.

FIG. 4 illustrates a possible configuration of a lighting means connection region 20 of a supply circuit board 14 with ribbon bonding contact elements 30, which are soldered onto connection pads 26. The ribbon bonding contact elements 30 can be accommodated, for example, on a magazine strip 54, on which they can in particular be glued or clipped-in beforehand, and can be transferred mechanically and automatically to the connection pads 26 and soldered thereto. In a further method step, bonding wires can be bonded to the upper side of the contact elements 30 and to connection points of the lighting means 12 for providing the ribbon bonded connection 28. The bonding wires preferably consist of aluminum.

In FIG. 5, an embodiment of a multilayer structure of a ribbon bonding contact element 30 is shown schematically. The ribbon bonding contact element 30 has a solder connection on an underside 34 of the contact element 30 with a connection pad 26 of a supply circuit board 14 and a bonded connection 28 on an upper side 32 of the contact element 30 with a bonding wire. The contact element 30 is of three-layer construction and has on its underside 34 a solder layer/tin layer SN with a preferred thickness of 5 μm to 20 μm, and its upper side 32 carries an aluminum-silicon alloy layer ALSi in a thickness range of 10 μm to 30 μm, which forms a bond base for producing a ribbon bonded connection 28 with an aluminum bonding wire. The central layer 36 defines the core of the contact element 30 and can preferably consist of a highly conductive material, in particular aluminum, a copper alloy, or copper. A bronze alloy layer, for example CuSn6, with 6% tin, which has good strength and spring properties with very good conductivity, is preferably suitable for this purpose. The thickness of the core layer 36 can preferably be 0.2 to 0.8 mm.

LIST OF REFERENCE SIGNS

10 Lighting module
12 Lighting means
14 Supply circuit board
16 Heat sink
18 Plug connection region
20 Lighting means connection region
22 Circuit board plug coupling
24 Tongue terminals
26 Connection pads
28 Ribbon bonded connection
30 Ribbon bonding contact elements
32 Upper side of ribbon bonding contact elements
34 Underside of ribbon bonding contact elements
36 Middle layer of ribbon bonding contact element
38 Circuit board receiving region
40 Lighting means receiving region
42 Recess portion of the circuit board receiving region
44 Heat conductive adhesive
46 Anodization layer
48 Flank region of the heat sink
50 Free surface region of the heat sink in the lighting means receiving region
52 Latching or rivet element
54 Magazine strip of the ribbon bonding contact elements

The invention claimed is:

1. Lighting module, for a vehicle, comprising a lighting means, a supply circuit board, and a heat sink, wherein the supply circuit board comprises a plug connection region for an external current signal supply and a lighting means connection region for an electrical connection of the lighting means, and wherein the plug connection region comprises tongue terminals affixed to the supply circuit board for electrically connecting a circuit board plug coupling of the external current signal supply, and the lighting means connection region comprises connection pads for an electrically conductive bonded connection of the lighting means to the supply circuit board, wherein ribbon bonding contact elements are electrically soldered on the connection pads on the supply circuit board in the lighting means connection region, and serve as a bond base for a ribbon bonded connection, wherein the ribbon bonding contact elements are multilayered, and have a bonding material-coated upper side and a solder connection layer underside.

2. The lighting module according to claim 1, wherein the lighting means is an LED lighting means.

3. The lighting module according to claim 1, wherein the ribbon bonded connection comprises an aluminum ribbon bonded connection.

4. The lighting module according to claim 1, wherein the bonding-material coated upper side of the ribbon bonding contact elements forms a bond base for producing the ribbon bonded connection with an aluminum bonding wire, wherein the connection pads are tin-plated, and wherein the solder connection layer underside of the ribbon bonding contact elements comprises a solder layer for a soldered connection to the tin-plated connection pads.

5. The lighting module according to claim 1, wherein the lighting means is electrically conductively connected to the lighting means connection region of the supply circuit board with the ribbon bonded connection.

6. The lighting module according to claim 5, wherein the ribbon bonded connection comprises an aluminum ribbon bonded connection produced by an ultrasonic welding method.

7. The lighting module according to claim 1, wherein the supply circuit board is tin-plated at least in a surface region of the plug connection region and in a surface region of the lighting means connection region.

8. The lighting module according to claim 7, wherein the connection pads are tin-plated.

9. The lighting module according to claim 1, wherein the ribbon bonding contact elements have a central layer.

10. The lighting module according to claim 9, wherein the central layer of the ribbon bonding contact elements comprises a copper core, aluminum core, or a core of a copper alloy or aluminum alloy.

11. The lighting module according to claim 1, wherein the heat sink comprises a circuit board receiving region for the supply circuit board, the supply circuit board having a thickness, and elevates, at least by the thickness of the supply circuit board, a lighting means receiving region for the lighting means.

12. The lighting module according to claim 11, wherein the heat sink consists of a thermally conductive material, and the supply circuit board is preferably fastened in the circuit board receiving region of the heat sink by means of mechanical latching or rivet elements.

13. The lighting module according to claim 12, wherein the heat sink consists essentially of copper, a copper alloy, or aluminum.

14. The lighting module according to claim 12, wherein the circuit board receiving region has a cut-out or recess portion around the plug connection region of the supply circuit board.

15. The lighting module according to claim 1, wherein the lighting means is fastened to a lighting means receiving region of the heat sink, in a heat-conducting manner relative to a circuit board receiving region of the supply circuit board of the heat sink.

16. The lighting module according to claim 15, wherein the lighting means is fastened to an elevated lighting means receiving region, in a heat-conducting manner relative to the circuit board receiving region of the supply circuit board of the heat sink, and is glued with a thermally conductive adhesive.

17. The lighting module according to claim 1, wherein the heat sink has, at least in regions, a surface anodization layer, and a lighting means receiving region, which has an exposed surface region without an anodization layer at least in regions thereof.

18. The lighting module according to claim 17, wherein the surface anodization layer extends over the entire surface of the heat sink, and wherein the anodization layer is removed from the light means receiving region to form the exposed surface region by means of laser ablation.

19. Vehicle light having a lighting module according to claim 1.

20. Vehicle light according to claim 19, wherein the lighting module comprises a headlight or taillight.

* * * * *